United States Patent [19]

Hirotsu et al.

[11] Patent Number: 5,455,891
[45] Date of Patent: Oct. 3, 1995

[54] SYSTEM AND METHOD FOR A LEARNING NEURAL NETWORK FOR GENERATING RANDOM DIRECTIONS FOR WEIGHT CHANGES

[75] Inventors: Kenichi Hirotsu, Kyoto, Japan; Martin A. Brooke, Atlanta, Ga.

[73] Assignee: Georgia Tech Research Corporation, Atlanta, Ga.

[21] Appl. No.: 131,121

[22] Filed: Oct. 4, 1993

[51] Int. Cl.⁶ .................................................. G06F 15/18
[52] U.S. Cl. .............................................. 395/23; 395/27
[58] Field of Search ................................... 395/23, 22, 27, 395/11, 24; 364/717

[56] References Cited

U.S. PATENT DOCUMENTS

| | | | |
|---|---|---|---|
| 4,493,046 | 1/1985 | Watanabe | 364/717 |
| 5,168,550 | 12/1992 | Sakaue et al. | 395/23 |
| 5,214,746 | 5/1993 | Fogel et al. | 395/23 |
| 5,258,903 | 11/1993 | Rodriguez-Cavazos | 395/27 |
| 5,324,991 | 6/1994 | Furuta et al. | 395/27 |

OTHER PUBLICATIONS

Caudill, M., "Neural Network Training TIPS and Techniques", AI Expert, Jan. 1991, 56–61.
Alspector, et al., "A VLSI–Efficient Technique for Generating Multiple Uncorrelated Noise Sources and Its Application to Stochastic Neural Networks", IEEE Trans. on Circuits and Systems, Jan. 1991, 109–123.
Cho, et al., "Fast Back–Propagation Learning Using Steep Activation Functions and Automatic Weight Reinitialization", Proc. 1991 IEEE Int'l. Conf. on Syst., Man., and Cybernetics, Oct. 1991, 1587–1592.
Von Lehmen, et al., "Factors Influencing Learning by Back–Propagation", IEEE Int'l. Conf. on Neural Networks, Jul. 1988, I–335–I–341.
McClelland, et al., Explorations in Parallel Distributed Processing, MIT Press, 1988, 137–141.
Narendra, et al., "Identification and Control of Dynamical Systems Using Neural Networks", IEEE Trans. on Neural Networks, Mar. 1990, 4–26.
Schwartz, T., "A Neural Chips Survey", AI Expert, Dec. 1990, 34–39.

*Primary Examiner*—Robert W. Downs
*Attorney, Agent, or Firm*—Hopkins & Thomas

[57] ABSTRACT

A learning neural network (30) implements a random weight change learning algorithm within a weight adjustment mechanism (28) for manipulating the weights applied to inputs of the network (30) in order to achieve a desired functionality for the network (30). Weights are changed randomly from an initial state with a small incremental weight change of either $+\delta$ or $-\delta$. If the overall network output decreases by the weight change, the same weight change is iterated until the error increases. If, however, the overall network error increases, the weights are changed randomly again. After iterating the foregoing methodology, the network error gradually decreases and finally reaches approximately zero. Furthermore, a shift mechanism (36) and a multiplier (38) are employed as a weight application mechanism (16). The shift mechanisms (36) are connected in series with a random line (35) and are connected in parallel with a shift line (44). A random direction is successively channelled through the shift mechanisms (36) via the random line (35) under the control of the shift line (44) so that only a single random number need be generated for all of the shift mechanisms (36) within the neural network (30).

25 Claims, 7 Drawing Sheets

SYSTEM AND METHOD FOR A LEARNING NEURAL NETWORK FOR GENERATING RANDOM DIRECTIONS FOR WEIGHT CHANGES

FIELD OF THE INVENTION

The present invention generally relates to neural networks, and more particularly, to a learning neural network having a learning algorithm for adjusting the parameters of the learning neural network so as to implement a particular functionality.

BACKGROUND ART

Neural networks are computing architectures modeled after the architecture of the human brain. As shown in FIG. 1, generally, a neural network 12 receives a plurality of inputs $I_0$–$I_m$, operates on the inputs $I_0$–$I_m$ based upon a desired function, and produces a plurality of network outputs $O_0$–$O_p$. Neural networks 12 are extremely fast because they process the inputs $I_0$–$I_m$ in parallel, in contrast to a computer which essentially runs in series. In structure, the neural network 12 comprises a plurality of "neurons" 14 which are organized in a series of successive layers. The layer nearest the outputs $O_0$–$O_p$ has neurons which are referred to as "output layer neurons," whereas the layer or layers situated prior to the output layer neurons have neurons which are referred to as "hidden layer neurons."

Each neuron 14 generally comprises the architecture as illustrated in FIG. 2. Any combination of available inputs may be provided to each neuron 14. In each neuron 14, a weight is initially applied to each input I which is connected to the neuron 14. As an example, FIG. 2 shows inputs $I_0$–$I_k$ passing into the neuron 14 in order to provide an output $O_q$. Weights $W_0$–$W_k$ are applied respectively to the inputs $I_0$–$I_k$ by weight application mechanisms 16, which may simply be multipliers for mathematically combining the weight with a respective input I. After the weights $W_0$–$W_k$ have been applied to the respective inputs $I_0$–$I_k$, the signals are mathematically combined via a summation operation, as indicated by the addition block 18 in FIG. 2. Next, the signal from the addition block 18 is sent to a nonlinear circuit 22, sometimes referred to in the art as a "sigmoid," where the signal undergoes a nonlinear transformation so as to provide the output $O_q$.

Typically, there are numerous weight application mechanisms 16 as well as numerous weight values which can be applied by the weight application mechanisms 16 in each network 12. Accordingly, it is extremely difficult to determine the weights to be applied to a particular set of inputs in order to achieve a desired functionality for the network 12 and a desired set of outputs, because of the requisite complex mathematics involved. For this reason, much effort has been dedicated to creating learning algorithms, or training algorithms, for determining appropriate weights to be applied in order to achieve a certain network functionality.

In general, a learning algorithm compares a series of actual network outputs $O_0$–$O_p$ with a corresponding series of desired values $O_0'$–$O_p'$. The series of desired values $O_0'$–$O_p'$ are based upon a desired functionality of the network 12. With reference to FIG. 1, the comparisons generate a series of errors $E_0$–$E_p$, as shown at error blocks 24. Further, the errors $E_0$–$E_p$ are usually mathematically made positive in such a way so as to insure that minimum error indicates the best match of the network functionality to the desired functionality. This procedure can be achieved by mathematical squaring, as indicated by dual arrows leading to multiplication blocks 25. Then, the squared values are mathematically combined via summation at an addition block 26 so as to provide a series of overall network errors $E_N$. The series of network errors $E_N$ is then sent to a weight adjustment mechanism 28, which generates from time to time directions (either +D or −D for each weight) in which each weight change should be implemented in the neurons 14. As illustrated in FIGS. 1 and 2, the directions (+D or −D) are sent via many parallel connections 29 to magnitude adjustment mechanisms 31, which are sort of gain controls, and the magnitude adjustment mechanisms 31 determine the magnitude δ of the weight change and combine this magnitude with the sign of the appropriate direction. Thus, an incremental change of either +δ or −δ is provided to each of the weight application mechanisms 16.

A well known technique which is employed within the weight adjustment mechanism 28 of FIG. 1 is the back propagation learning algorithm. Entire textbooks have been written on this subject. In accordance with the back propagation learning algorithm, the gradient (slope on a graph) of an error is determined with respect to each weight, and the gradient indicates the direction in which each weight must be manipulated. In mathematics, this technique is sometimes referred to as a form of gradient descent.

However, most learning algorithms, including back propagation, require complex multiplication, summation, and generation of mathematical derivatives. These mathematical operations require enormous processing support, and much space must be utilized in order to implement multipliers and summers, especially when large numbers of neurons 14 are utilized. The serial operation of digital circuits can be used to reduce the size, but this results in slow processing time and a long learning period. If parallel analog circuits are utilized instead of digital circuits, learning speed is faster and the requisite area is reduced; however, non-idealities of analog circuits make it very difficult to achieve a learning algorithm exactly as expected, causing degradation of learning ability or sometimes even the absence of learning. The back propagation learning algorithm is particularly susceptible to these non-idealities.

Thus, a heretofore unaddressed need exists in the industry for a learning algorithm which may be employed in connection with a neural network to improve both signal processing speed and learning period without the need for complex circuitry, such as multiplication.

SUMMARY OF THE INVENTION

Briefly described, the present invention provides a method for adjusting the weights of a neural network and provides for a learning neural network having a learning algorithm for adaptively modifying its corresponding weights in order to achieve a specific network functionality. In accordance with the methodology, weights are randomly changed from initial states by incremental changes (+δ or −δ). Moreover, if the network error of the network decreases after changing the weights, then the incremental changes are iterated until the network error increases, and if the network error increases after changing the weights, then the weights are once again randomly changed. This procedure is iterated until the network error approaches zero.

The foregoing methodology can be more specifically described as follows. A set of first directions (for instance, + or −) are arbitrarily selected, perhaps randomly, for respective incremental changes (δ) in respective first weights of the network. The first weights are incremented by the respective incremental changes to form second weights. A series of network outputs is then generated from the series of network inputs in combination with the second weights. An overall network error is generated pertaining to the series of network outputs by mathematically combining the network outputs with desired outputs corresponding to the network inputs. When the overall network error decreases in magnitude, the second weights are once again incremented in the first directions by the respective incremental changes in order to form third weights, and the series of network outputs are generated from the network inputs in combination with the third weights. When the error increases in magnitude, a set of second directions are arbitrarily selected, perhaps randomly, for the respective incremental changes, the second weights are incremented in the second directions by the respective incremental changes in order to form fourth weights, and the network output is generated from the network inputs in combination with the fourth weights.

In accordance with another feature of the present invention, directions for weight changes can be generated by shifting a random number successively to the various weight mechanisms within the network, and the random number (for instance, a random selection of either +1 or −1) is utilized for designating the direction of weight changes.

An advantage of the present invention is that signal processing speed, learning period, and ability are enhanced over prior art embodiments.

Another advantage of the present invention is that the novel learning algorithm can be implemented without complicated multiplication circuitry, resulting in easy implementation within electronic circuits and in a reduction to requisite space for implementing the same.

Another advantage of the present invention is that processing circuitry is minimized by generating a single random number which is then successively shifted to each of the weight mechanisms within the network, the random number being indicative of a direction for weight changes.

Another advantage of the present invention is that the learning neural network can be utilized to efficiently and accurately control an unknown plant, which may be either nonlinear or linear and which may exhibit any order of complexity.

Other objects, features, and advantages of the present invention will become apparent to one of skill in the art upon examination of the following drawings and detailed description.

BRIEF DESCRIPTION OF THE DRAWINGS

The present invention can be better understood with reference to the following drawings. The drawings are not necessarily to scale, emphasis instead being placed upon clearly illustrating the principles of the present invention.

DETAILED DESCRIPTION OF THE PREFERRED EMBODIMENT

Figure 3:
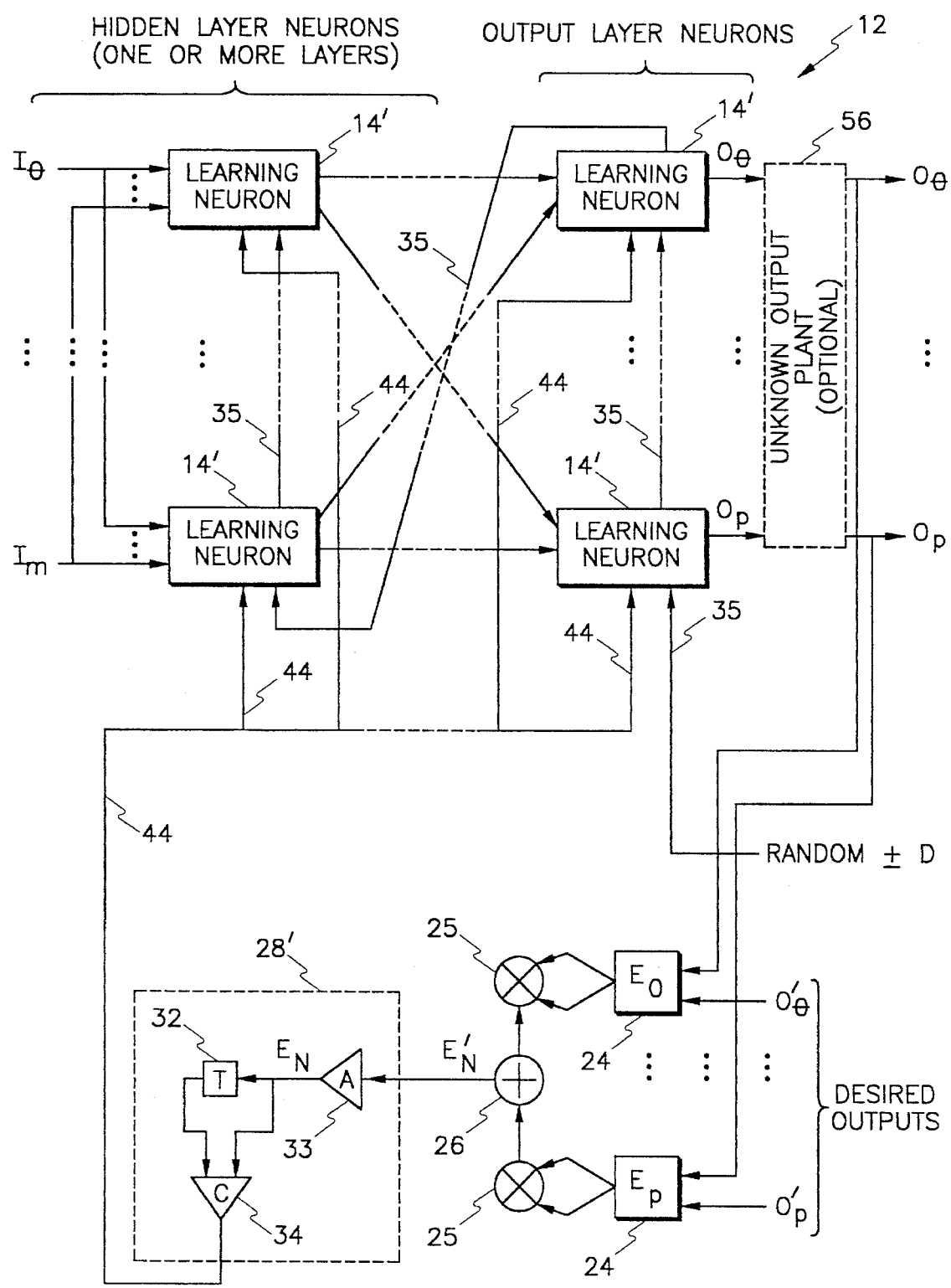
FIG. 3 is a block diagram of a learning neural network in accordance with the present invention.

With reference now to the drawings wherein like reference numerals designate corresponding parts throughout the several views, FIG. 3 shows a novel learning neural network 30 which implements a novel random weight change learning algorithm in accordance with the present invention. The learning neural network 30 comprises a plurality of learning neurons 14' for generating a plurality of outputs $O_0-O_p$ from the combination of a plurality of inputs $I_0-I_m$ and a plurality of weights $W_0-W_p$, which are manipulated via a novel weight adjustment mechanism 28'. The neural network 30 may comprise any number of neuron layers. Moreover, any combination of available inputs may be provided to each neuron 14'. In other words, each neuron 14' in the first layer shown in FIG. 3 may receive any combination of inputs $I_0-I_m$, and each outer layer neuron 14' may receive any combination of neuron outputs from hidden layer neurons. Furthermore, each of the outputs $O_0-O_p$ is compared with respective desired outputs $O_0'-O_p'$ in order to generate respective errors $E_0-E_p$, as noted at the blocks 24. These errors $E_0-E_p$ are then mathematically squared, as indicated at blocks 25, and the resultant squared errors are then added together, as noted at the addition block 26, so as to generate a series of errors $E_N'$ from the series of inputs $I_0-I_n$.

In the learning neural network 30, the weight adjustment mechanism 28' comprises a time delay mechanism (T) 32, an accumulation mechanism (A) 33, and a comparator (C) 34. The accumulation mechanism 33 accumulates the series of errors $E_N'$ so as to generate an overall network error $E_N$ for analysis. The accumulation mechanism 33 is optional, but is preferred in that it facilitates learning of the learning neural network 30 because it permits adjustment of weights based upon a plurality of input/output relationships over a period of time. Moreover, the time delay mechanism 32 receives the overall network error $E_N$. The comparator 34 compares the overall network error $E_N$ and the time delay output from the time delay mechanism 32 in order to determine whether the network error $E_N$ has increased or decreased after manipulating weights. This information is then forwarded to the learning neurons 14', which then supply weight changes $\delta$ with either a positive polarity or a negative polarity. The polarity of the weight change $\delta$ specifies the direction in which the weights will be changed.

Significantly, in accordance with a random weight change learning algorithm of the present invention, weights are first changed randomly from their initial states by a small incremental weight change of either $+\delta$ or $-\delta$. The random weight change direction (+D or −D) is fed to the learning neurons 14', as indicated by reference numeral 35 in FIG. 3. Within the context of this document, "random" selection refers to truly random selection, pseudo-random selection, or any other selection characterized by arbitrary identification of a new value within a set which has substantially equal probability of selection as compared to other nonselected values in the set. Moreover, if the overall network error $E_N$ decreases after implementation of the previous weight change, then the same weight change is iterated until the error $E_N$ increases. However, if the overall network error $E_N$ increases, weights are changed randomly once again. After iterating the foregoing methodology, the output error $E_N$ and errors $E_0$–$E_p$ gradually decrease and finally approach zero.

The random weight change learning algorithm of the present invention can be expressed mathematically as follows:

$$W_{ij}(n+1) = W_{ij}(n) + \Delta W_{ij}(n+1)$$

$$\Delta W_{ij}(n+1) = \Delta W_{ij}(n) : if\ E(n+1) < E(n)$$

$$\Delta W_{ij}(n+1) = \delta * Rand(n) : if\ E(n+1) \leq E(n)$$

(Rand(n):Random function which has only two states ±1)

where $W_{ij}$ represents the ith weight in the jth layer and where E represents the overall network error. The above equations are implemented by the time delay mechanism 32 in combination with the comparator 34, both of FIG. 3.

Figure 4:
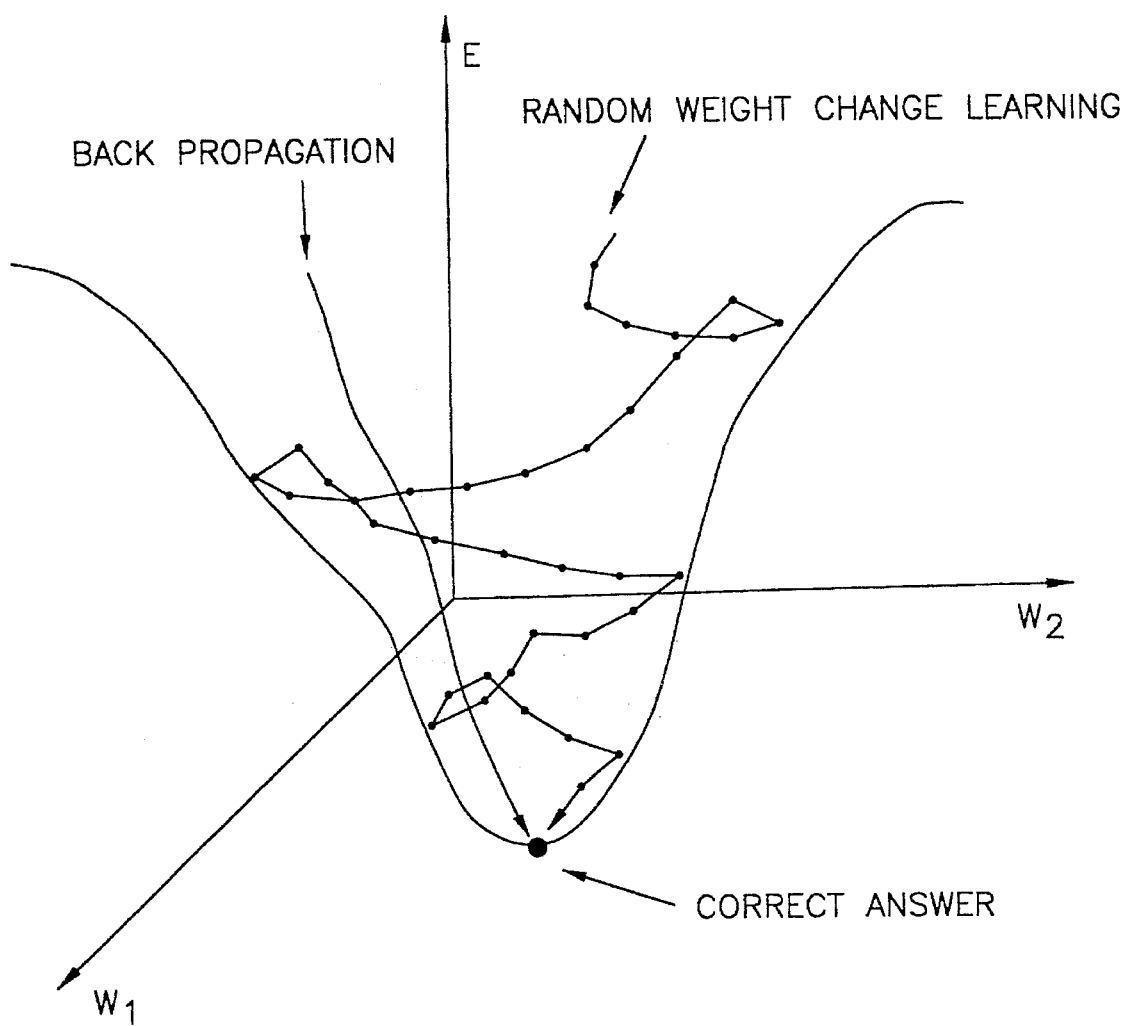
FIG. 4 is a three dimensional graph comparing the conventional back propagation learning algorithm with the random weight change learning algorithm of the present invention.

FIG. 4 shows a comparison between the conventional back propagation learning algorithm and the random weight change learning algorithm of the present invention. In the back propagation learning algorithm, the operating point travels down along the steepest slope of the overall network error curve corresponding to the neural network 12. The direction for weight changes corresponds to the gradient of the overall network error curve E. In contrast, in the random weight change learning algorithm of the present invention, the operating point goes up and down on the overall network error curve E, rather than descending straight along the steep slope, but statistically and ultimately the operating point descends to the correct answer, where the error is zero. In essence, each change of direction along the jagged operating curve represents generation of a new random direction.

As is obvious from FIG. 4, the random weight change learning algorithm of the present invention is less efficient than the back propagation learning algorithm. However, the random weight change learning algorithm does not need multipliers, which can cause offsets or non-idealities in analog implementations and which leads to further complexities in digital circuits. Moreover, very simple circuits for weight updates are available, which have only two states of weight change +δ, −δ. Finally, the random weight change learning algorithm does not require any specific network structure. Hence, by trading off some degree of efficiency, the preceding significant advantages are realized in the present invention.

Figure 5:
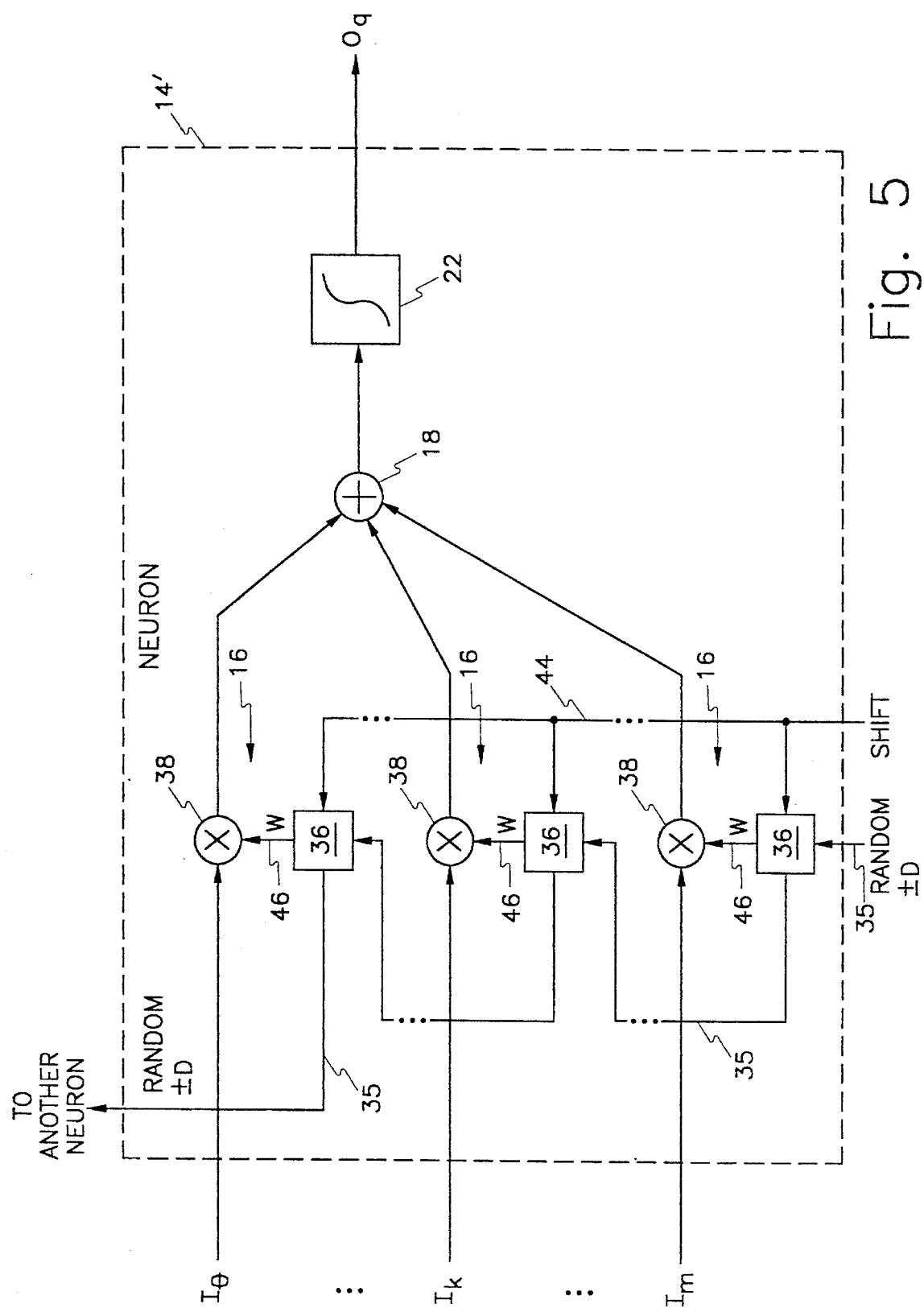
FIG. 5 is a block diagram of a neuron of FIG. 3.

FIG. 5 shows a learning neuron architecture for utilizing the randomly-generated weight changes to the best advantage. As shown in FIG. 5, each weight application mechanism 16 comprises a shift mechanism 36 and a multiplier 38. The shift mechanism 36 provides a weight to the multiplier 38, which mathematically combines the weight with an input $I_x$, where $I_x$ is any one of $I_0 \ldots I_k \ldots I_m$. Moreover, the shift mechanisms 36 are connected in series via a random line 35 and are connected in parallel via a shift line 44. Preferably, the random line 35 is connected through the neuron layers in reverse succession (from the outer layers inwardly toward the hidden layers), as illustrated in FIG. 3, so as to achieve substantially true random generation with respect to each neuron 14'. With reference to FIG. 5, in operation, a randomly-generated direction is input into the learning neuron 14' and is passed from shift mechanism 36 to shift mechanism 36 along the series via the random line 35 under the control of the shift line 44. With the foregoing configuration, only one random direction need be generated at a time so as to eliminate the need for generating a random direction for each of the shift mechanisms 36, thereby minimizing processing circuitry.

Figure 6:
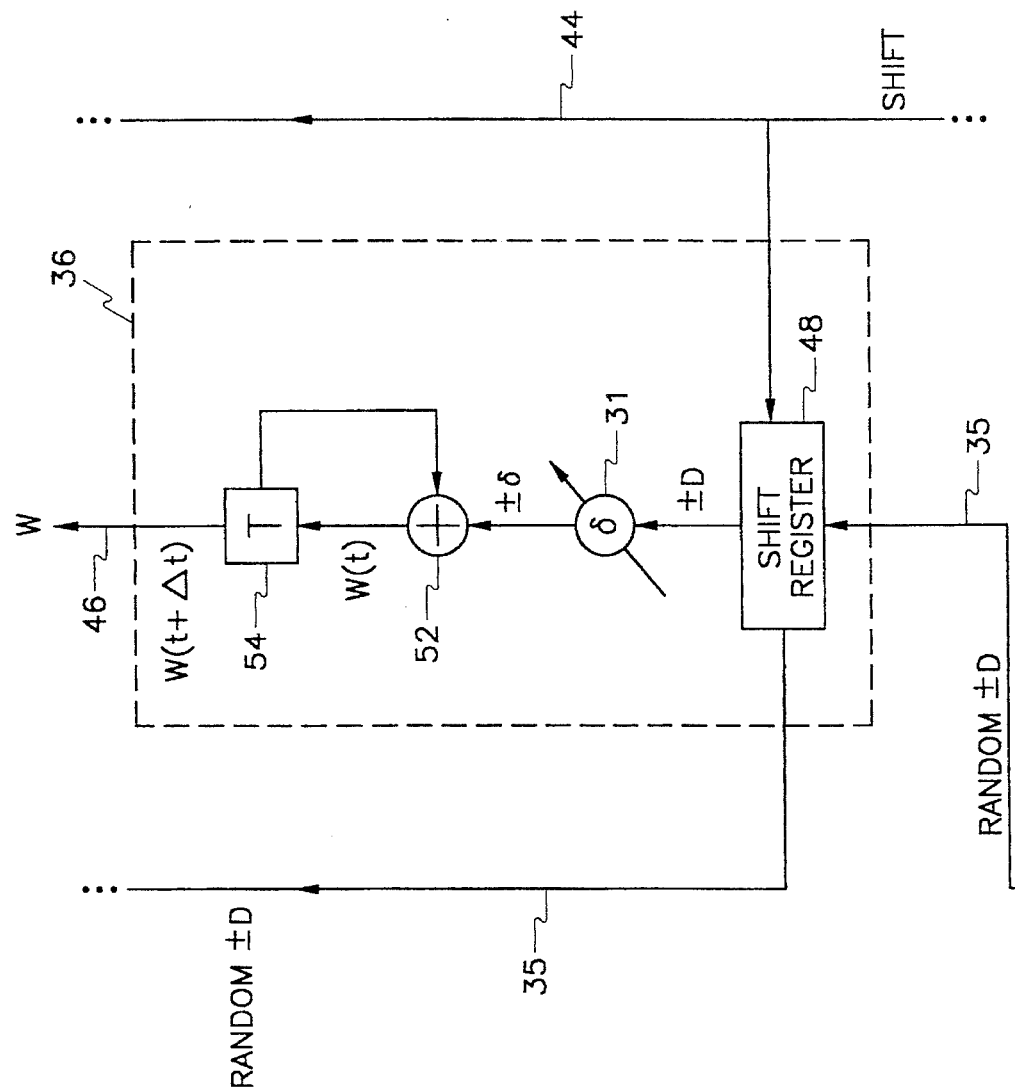
FIG. 6 is a block diagram of a weight application mechanism of FIG. 5.

The shift mechanism 36 is shown in further detail in FIG. 6. With reference to FIG. 6, the shift mechanism 36 comprises a shift register 48 for receiving a random direction from random line 35 and for receiving a shift control signal from the shift line 44. The shift mechanism 36 further comprises an addition block 52 for receiving an incremental change (either +δ or −δ) from the shift register 48, which incremental weight change is specified by the random line 35. The addition block 52 combines the incremental weight change with the existing weight W in order to provide a weight at line 46, which weight is combined with the corresponding input I. If the shift register 48 does not receive a pulse on the shift line 44, then the weight W is changed in the same direction (either + or −) and by the same weight change δ. However, if the shift register 48 does receive a pulse on the shift line 44, then another random direction is forwarded to the shift register 48 via the directional line 35 and a new direction for δ is forwarded to the addition block 52 and ultimately to the input I.

Figure 7:
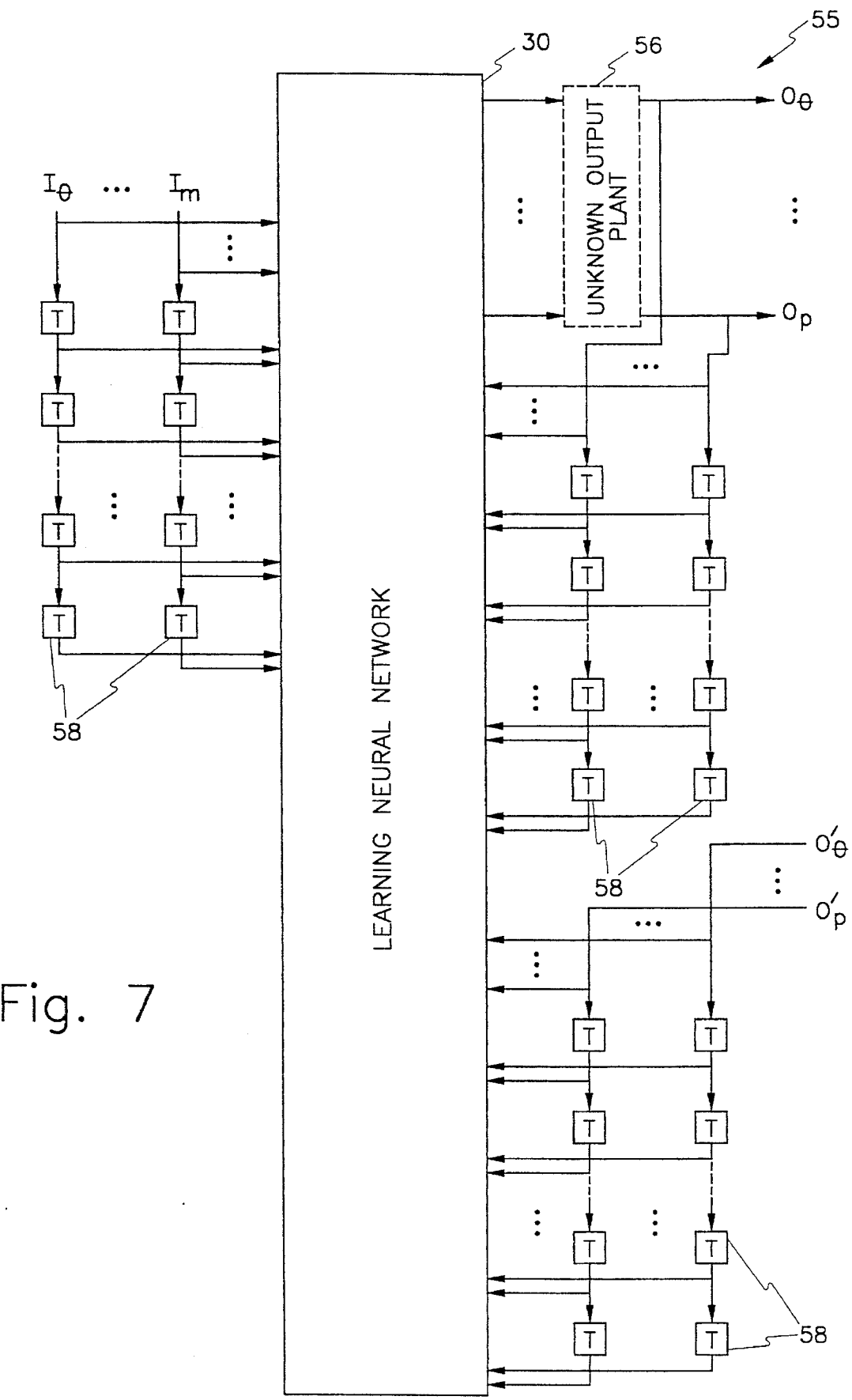
FIG. 7 is a block diagram of an application for the learning neural network of FIG. 3 wherein an unknown plant is controlled by the learning neural network.

FIG. 7 shows a possible application 55 for the learning neural network 30 wherein the learning neural network 30 is used to control an unknown plant 56. In this document, the unknown plant 56 is defined as any system or apparatus having outputs controlled by inputs. Further, the unknown plant 56 may be nonlinear or linear and may exhibit any order of complexity.

Figure 1:
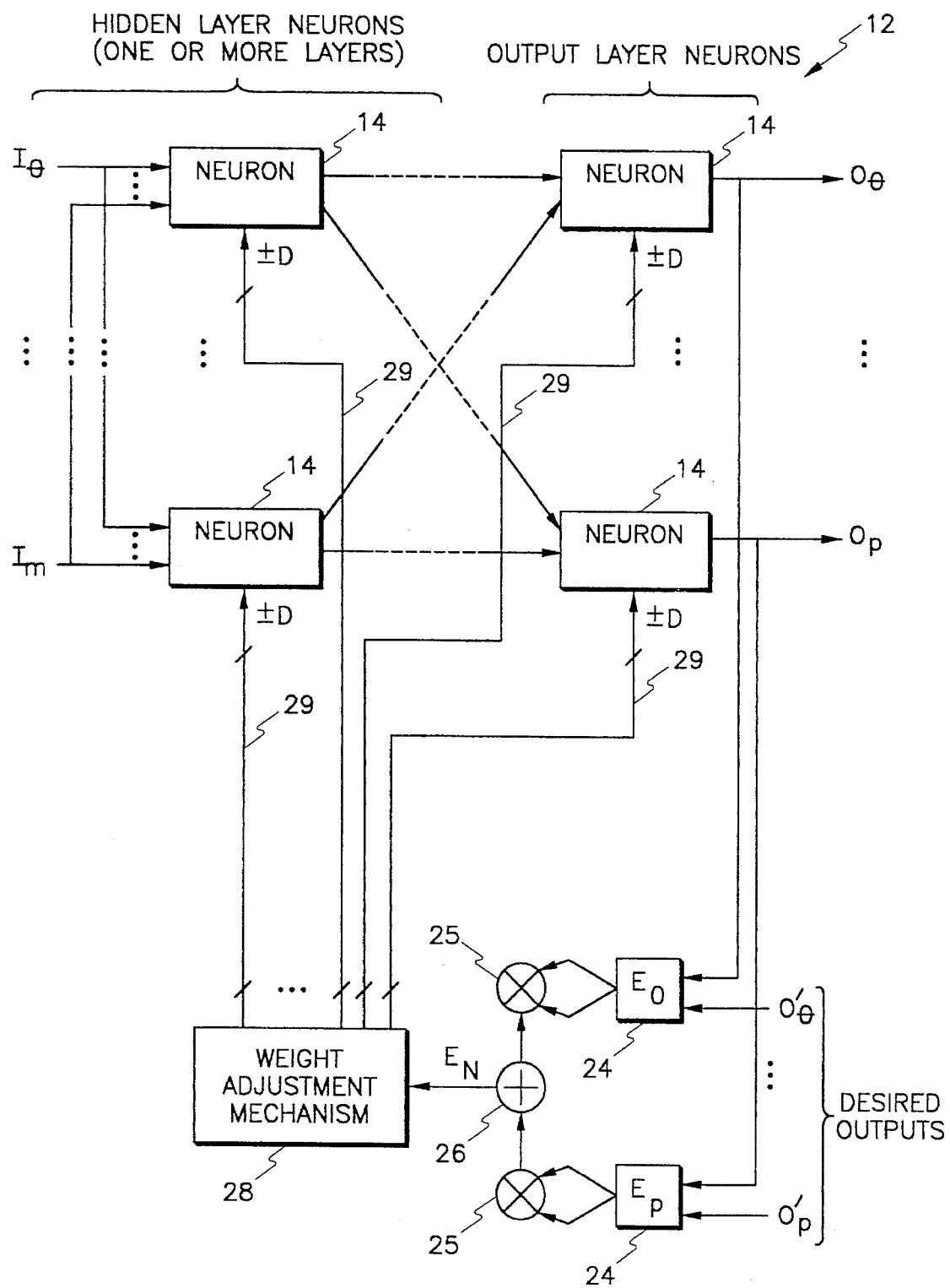
FIG. 1 is a block diagram of a conventional learning neural network having a weight adjustment mechanism for implementing a learning algorithm for adjusting the weights within the neural network.
Figure 2:
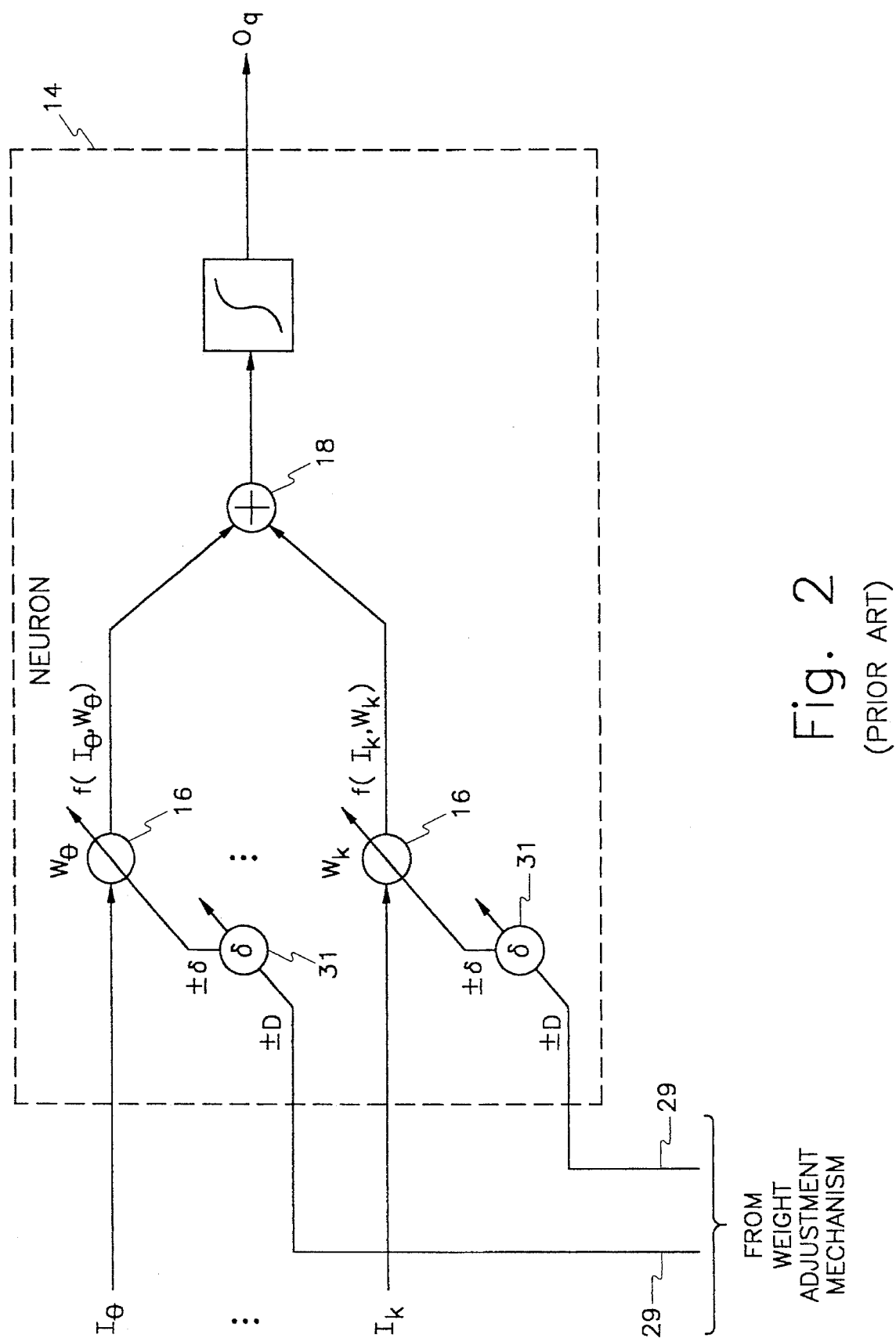
FIG. 2 is a block diagram of a neuron of FIG. 1.

In the embodiment of FIG. 7, the unknown plant 56 is connected directly to the outputs $O_0$–$O_p$ of the network 30. Generally, the outputs $O_0$–$O_p$ directly control the unknown plant 56 and the inputs $I_0$–$I_m$ of the neural network 30 indirectly control the unknown plant 56 after manipulation of the inputs $I_0$–$I_m$ by the neural network 30. The inputs $I_0$–$I_m$ are delayed by different time periods using the delay blocks 58. The actual inputs and the delayed inputs are fed to the learning neural network 56, and each input has a dedicated weight application mechanism 16 (FIG. 2). Similarly, the unknown plant outputs $O_0$–$O_p$ and the desired plant outputs $O'_0$–$O'_p$ are delayed by several different time periods via delay blocks 58, as shown. Moreover, the actual outputs $O_0$–$O_p$, the desired plant outputs $O'_0$–$O'_p$, the delayed actual outputs, and the delayed desired outputs are used by the learning neural network 30 to generate the overall error signal $E_N'$ (FIG. 3). The network 30 then uses the error signal $E_N'$ to control the weight updates. Because the learning neural network 30 can learn nonlinear functions as well as linear functions, the application 55 of FIG. 7 shows that the learning neural network 30 can be used to control a wide variety of unknown plants 56.

Finally, it will be obvious to those skilled in the art that many variations may be made to the above-described preferred embodiment without substantially departing from the spirit and scope of the present invention. Accordingly, all such variations are intended to be included herein within the scope of the present invention, as set forth in the following claims.

Wherefore, the following is claimed:

1. A method for minimizing the computational complexity of adjusting weights in a neural network having a network input signal and a network output signal, comprising the steps of:

(a) arbitrarily selecting a first direction for each of said weights in said neural network;

(b) determining a network error by comparing said network output signal with a desired network output signal;

(c) determining a change in said network error by comparing said network error with a previously determined network error;

(d) if the network error has decreased, then changing each weight in the neural network by an incremental amount in said first direction;

if the network error has increased, then arbitrarily selecting a second direction for each of said weights and changing each weight in said neural network by said incremental amount in said second direction; and (e) repeating steps (b) through (d) until said neural network generates said desired network output signal.

2. The method of claim 1, further comprising the step of controlling a plant with the desired network output signal.

3. A method for minimizing the computational complexity of adjusting weights in a neural network having a network input signal and a network output signal, comprising the steps of:

(a) arbitrarily selecting a first direction of change for each weight in the network;

(b) generating said network output signal from said network input signal in combination with the weights in the neural network;

(c) generating an error pertaining to said network output signal by comparing said network output signal with a desired network output signal corresponding to said network input signal;

(d) when said error has decreased in magnitude from a previously determined error,
 (i) changing each of said weights by an incremental amount in said first direction; and
 (ii) generating the network output signal from the network input signal in combination with said weights changed in the first directions; and (e) when said error has increased in magnitude from said previously determined error,
 (i) arbitrarily selecting a second direction for each of said weights in the neural network;
 (ii) changing each of said weights by an incremental amount in said second direction; and
 (iii) generating the network output signal from the network input signal in combination with said weights changed in the second directions; and (f) repeating steps (c) through (e) until said network output signal equals said desired network output signal.

4. The method of claim 3, wherein said error is generated by accumulating the sum of the square of the difference between said desired network output signal and said network output signal.

5. The method of claim 3, wherein said error is generated by computing the absolute value of the difference between said desired network output signal and said network output signal.

6. The method of claim 3, wherein said error is generated by computing a positive number by mathematically combining said desired network output signal and said network output signal.

7. The method of claim 3, further comprising the step of using a random generator to select said first and second directions.

8. A system for learning weights to be applied in a neural network to a network input signal in order to achieve a desired network output signal, the system comprising:

means for arbitrarily selecting a first direction of change for each weight in the network;

means for changing said weights by an incremental amount, said changing means either increasing or decreasing each of said weights by said incremental amount;

means for generating a network output signal from the network input signal and said weights;

means for generating an error pertaining to said network output signal by mathematically comparing said network output with said desired network output signal corresponding to said network inputs;

learning means for determining when said error has decreased and when said error has increased in comparison to a previously determined error;

said learning means, when said error has decreased, for changing each of said weights by said incremental amount in said first direction and for generating the network output signal from the network input signal and said weights changed in the first direction; and said learning means, when said error has increased, for arbitrarily selecting a second direction for each of said weights for changing each of said weights by said incremental amount in said second direction, and for generating the network output signal from the network input signal and said weights changed in the second direction.

9. A method for a neural network having a plurality of weight mechanisms which combine weights with network values, the method for generating weights while minimizing computational complexity and enhancing speed, comprising the steps of:

generating a random number;

providing the random number to each of the plurality of the weight mechanisms in succession;

generating polarities for the weights at respective weight mechanisms based upon the random number; and generating the weights at respective weight mechanisms by combining said polarities with respective magnitudes.

10. The method of claim 9, wherein said network comprises a plurality of neuron layers, and further comprising the step of transporting the random number through said neuron layers in a direction substantially opposite to data flow through said network.

11. The method of claim 9, further comprising the step of moving the random number from an output layer of said network in a direction toward an input layer of said network.

12. In a neural network having a plurality of neurons for receiving network inputs and for generating a network output, the neural network having a plurality of weight mechanisms for modifying the network inputs by increments, an improvement for minimizing complexity while enhancing speed, the improvement comprising a shift register means for delivering a random code successively to said plurality of weight mechanisms, the random code for designating a direction of increment change and for causing each of said weight mechanisms to implement the direction of increment change upon receipt.

13. The improvement of claim 12, further comprising a random generator for generating the random code and for forwarding the random code to said shift register means.

14. The improvement of claim 12, wherein said weight mechanisms each comprise a multiplier configured to combine a weight and a network input.

15. The improvement of claim 12, further comprising a plant connected to the network output and controlled by the network output.

16. The improvement of claim 12, wherein said shift register means comprises a plurality of shift registers associated respectively with said plurality of weight mechanisms, said shift registers being interconnected in series and configured to communicate said random code through said shift registers successively.

17. The improvement of claim 12, wherein said network comprises a plurality of neuron layers and wherein said shift register means is configured to deliver said random code through said layers in a direction substantially opposite to data flow through said network.

18. The improvement of claim 12, wherein said shift register means is configured to communicate said random code from a first neuron to a second neuron, said first neuron being located in said network in a layer closer to said network output than said second neuron.

19. A system for a neural network for minimizing requisite processing circuitry, comprising:

a plurality of weight means, each of said weight means for mathematically combining a weight with a network value;

means for generating a random direction; and shift means for receiving said random direction and for providing said random direction to each of said plurality of weight means in succession.

20. The system of claim 19, further comprising a plant connected to outputs of the network and controlled by the network.

21. The system of claim 19, wherein each of said weight means comprises a multiplier configured to combine a weight and a network input.

22. The system of claim 19, Wherein said network comprises a plurality of neuron layers and wherein said shift means provides the random direction through said layers in a direction substantially opposite to data flow through said network.

23. The system of claim 19, wherein said shift means is configured to communicate said randomly-generated direction from a first neuron to a second neuron, said first neuron being located in said network in a layer closer to a network output than said second neuron.

24. The system of claim 19, wherein said shift means comprises a plurality of shift registers associated respectively with said weight means, said shift registers for receiving the random direction and for shifting the random direction through each said shift register and from one shift register to another in succession.

25. The system of claim 19, wherein said weight means comprises a multiplier interconnected with a magnitude adjustment mechanism, said magnitude adjustment mechanism for receiving the random direction.

* * * * *